United States Patent Office 3,781,310
Patented Dec. 25, 1973

3,781,310
WATER-SOLUBLE ANTHRAQUINONE
DYESTUFFS
Fritz Meininger and Hartmut Springer, Frankfurt am Main, Germany, assignor to Farbwerke Hoechst Aktiengesellschaft vormals Meister Lucius & Bruning, Frankfurt am Main, Germany
No Drawing. Filed Oct. 23, 1970, Ser. No. 83,656
Claims priority, application Germany, Oct. 24, 1969,
P 19 53 600.6
Int. Cl. C09b 1/34
U.S. Cl. 260—374  5 Claims

ABSTRACT OF THE DISCLOSURE

A water-soluble anthraquinone dyestuff having in form of the free acid the formula

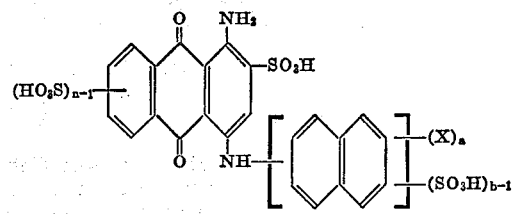

in which X represents $-SO_2-CH=CH_2$, $-SO_2-CH_2-CH_2-OH$, $-SO_2-CH_2-CH_2-O-SO_3H$, $-SO_2-CH_2-CH_2-S-SO_3H$, $-SO_2-CH_2-CH_2-O-PO_3H_2$,

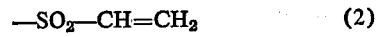

or $-SO_2-CH_2-CH_2-N$ (lower alkyl)$_2$, $n$ is 1, 2 or 3, $a$ is 1 or 2 and $b$ is 1, 2, or 3, said dyestuffs being highly suitable for the dyeing or printing of leather, wool, silk, fibrous materials of polyamides, polyurethanes and particularly of native or regenerated cellulose, the dyeings and prints obtained on the said materials showing intense blue to green-blue shade and being distinguished by very good fastness to wet processing and a good fastness to light.

The present invention relates to new, water-soluble anthraquinone dyestuffs which, in the form of the free acid, correspond to the General Formula 1

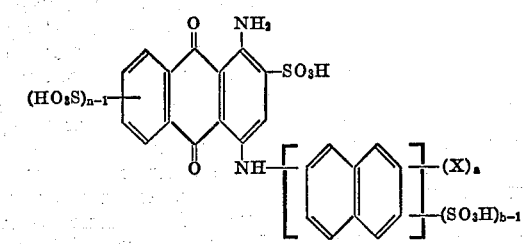

in which X represents a group of the Formula 2 or the Formula 3

$$-SO_2-CH=CH_2 \quad (2)$$

$$-SO_2-CH_2-CH_2-Z \quad (3)$$

in which Z represents a hydroxyl group or an inorganic or organic radical capable of being split off by alkaline agents, $a$ stands for the integer 1 or 2 and $b$ and $n$ stand for integers of from 1 to 3.

The present invention relates further to a process for the manufacture of these water-soluble anthraquinone dyestuffs, wherein 4-bromo-1-amino-anthraquinone-sulfonic acids of the Formula 4

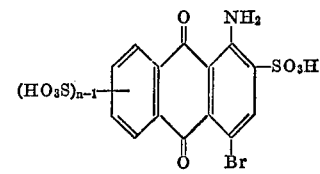

in which $n$ represents an integer of from 1 to 3, are reacted with naphthylamines of the Formula 5

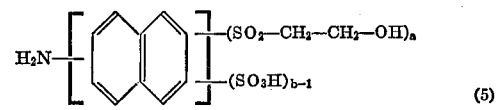

in which $a$ and $b$ are as defined above, at temperatures of from about 20° C. to about 100° C., preferably of from about 50 °C. to about 70° C., at a pH of from about 7 to about 11 in an aqueous-organic medium, or preferably in a purely aqueous medium, in the presence of acid-binding agents, preferably in the presence of catalysts, for example monovalent copper salts and metallic copper, and the anthraquinone compounds obtained which correspond to the General Formula 6

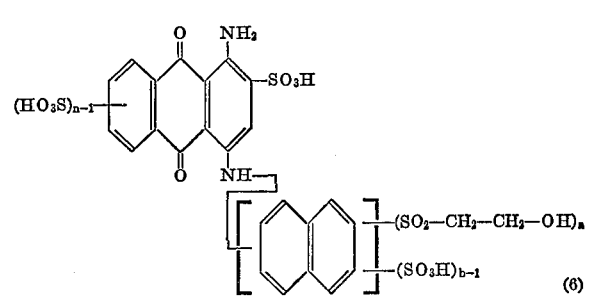

in which $a$, $b$ and $n$ are as defined above, are optionally converted into anthraquinone dyestuffs of the Formula 1, in which X represents a group of the Formula 2 or the Formula 3, in known manner, by esterification, treatment with alkaline agents and reaction with dialkylamines or salts of thiosulfuric acid.

As inorganic or organic radicals Z which can be split off by alkaline agents, the following substances may be used: alkylsulfonic acid ester or arylsulfonic acid ester groups, for example the methylsulfonyloxy or the p-toluenesulfonyloxy group; acyloxy groups, for example the acetoxy or the 3-sulfobenzoyloxy group; dialkylamino groups, for example the dimethyl- or the diethylamino group; further the thiosulfuric acid ester or the phosphoric acid ester group, and especially the sulfuric acid ester group.

For the preparation of dyestuffs of the General Formula 1, in which X represents the group $$-SO_2-CH_2-CH_2-OSO_3H,$$

the hydroxyl group of the side chain $$-SO_2-CH_2-CH_2-OH$$

of the dyestuffs of the General Formula 6 obtained in the first place is esterified in known manner with sulfatation agents, for example concentrated sulfuric acid, chlorosulfonic acid, amido-sulfonic acid or sulfur trioxide yielding compounds.

For the preparation of dyestuffs of the General Formula 1, in which X represents the group $$-SO_2-CH_2-CH_2-OPO_3H_2,$$

the hydroxyl group of the side chain $$-SO_2-CH_2-CH_2-OH$$

of the dyestuffs of the General Formula 6 obtained in the first place is esterified in known manner with phosphorylating agents, for example concentrated phosphoric acid, pyrophosphoric acid, metaphosphoric acid, polyphosphoric acid, alkyl esters or acidic alkyl esters of condensated phosphoric acids, mixtures of phosphoric acid and phosphorus pentoxide or with phosphoroxychloride.

For the preparation of dyestuffs of the General Formula 1, in which Z represents an alkyl- or arylsulfonic acid ester group or an acyloxy group, the hydroxyl group of the side chain $-SO_2-CH_2CH_2-OH$ of the dyestuffs of the General Formula 6 obtained in the first place is esterified in known manner with alkyl- or arylsulfonic acid chlorides, for example methane-sulfonic acid chloride or p-toluensulfonic acid chloride, or with carboxylic acid chlorides, for example acetyl chloride or 3-sulfobenzoyl chloride.

Dyestuffs of the General Formula 1 in which X represents the group $-SO_2-CH=CH_2$ are prepared in an additional reaction step from dyestuffs of the General Formula 1 in which X represents a group of the Formula 3, in known manner by a treatment with alkaline agents, for example sodium carbonate or sodium hydroxide.

Dyestuffs of the General Formula 1, in which Z represents a thiosulfuric acid ester group or a dialkylamino group, are prepared in known manner in further reaction steps from dyestuffs of the General Formula 1, in which X represents the group (2), by reaction with salts of thiosulfuric acid, for example sodium thiosulfate, or by reaction with dialkylamines, for example dimethylamine or diethylamine.

4-bromo-1-amino-anthraquinone-sulfonic acids of the Formula 4 suitable for the use in the process of the invention are for example:

4-bromo-1-amino-anthraquinone-2,5,8-trisulfonic acid,
4-bromo-1-amino-anthraquinone-2,5-disulfonic acid,
4-bromo-1-amino-anthraquinone-2,6-disulfonic acid,
4-bromo-1-amino-anthraquinone-2,8-disulfonic acid and especially
4-bromo-1-amino-anthraquinone-2-sulfonic acid.

Also mixtures of such 4-bromo-1-amino-anthraquinone-sulfonic acids may be used.

Suitable naphthalene compounds of the Formula 5 are for example:

1-amino-4-(β-hydroxy-ethylsulfonyl)-naphthalene,
1-amino-5-(β-hydroxy-ethylsulfonyl)-naphthalene,
1-amino-6-(β-hydroxy-ethyl-sulfonyl)-naphthalene,
1-amino-7-(β-hydroxy-ethylsulfonyl)-naphthalene,
2-amino-5-(β-hydroxy-ethylsulfonyl)-naphthalene,
2-amino-6-(β-hydroxy-ethylsulfonyl)-naphthalene,
2-amino-7-(β-hydroxy-ethylsulfonyl)-naphthalene,
2-amino-8-(β-hydroxy-ethyl-sulfonyl)-naphthalene,
3-amino-1,5-bis(β-hydroxy-ethylsulfonyl)-naphthalene,
1-amino-3,6-bis-(β-hydroxy-ethylsulfonyl)-naphthalene,
2-amino-6,8-bis-(β-hydroxy-ethylsulfonyl)-naphthalene,
1-amino-5-(β-hydroxy-ethylsulfonyl)-naphthalene-7-sulfonic acid,
1-amino-7-(β-hydroxy-ethylsulfonyl)-naphthalene-4-sulfonic acid,
2-amino-6-(β-hydroxy-ethylsulfonyl)-naphthalene-8-sulfonic acid,
2-amino-8-(β-hydroxy-ethylsulfonyl)-naphthalene-6-sulfonic acid or
2-amino-6,8-bis-(β-hydroxy-ethylsulfonyl)naphthalene-3-sulfonic acid.

The starting compounds of the Formulas 4 and 5 are chosen in such a way that the dyestuffs of the Formula 1 prepared according to the process of the invention contain from 1 to 6, preferably from 2 to 4, water-solubilizing groups, for example sulfonic acid, sulfuric acid ester, thiosulfuric acid ester or phosphoric acid ester groups.

Suitable acid-binding agents which are used in the reaction of the 4-bromo-1-amino-anthraquinone-sulfonic acids of the Formula 4 with the naphthalene compounds of the Formula 5 according to the process of the invention are for example alkali carbonates and alkali bicarbonates, such as sodium and potassium carbonate or bicarbonate, disodium hydrogen phosphate, sodium acetate or tertiary organic bases, for example pyridine, picoline, lutidine, triethylamine or dimethylaniline.

As organic solvent components for the reaction of 4-bromo-1-amino-anthraquinone-sulfonic acid of the Formula 4 with the naphthylamine compounds of the Formula 5 in an aqueous-organic medium according to the process of the invention, for example lower mono- or multivalent alcohols, such as methanol, ethanol, propanol, butanol or glycol, further dimethyformamide, dimethylsulfoxide, N-methylacetamide, N-methyl-pyrrolidone or pyridine may be used.

Isolation of the anthraquinone dyestuffs of the general Formula 1 is carried out by salting out, for example with sodium or potassium chloride, or by spray drying of the prepared mixture.

The new anthraquinone dyestuffs of the said General Formula 1 are highly suitable for the dyeing and printing of different materials, for example of leather, wool, silk, polyamide or polyurethane fibres, but especially of materials containing cellulosic fibres, for example cotton, spun-rayon and linen. They may be used according to the dyeing and printing processes for reaction dyestuffs generally used in industrial practice and on cellulosic fibre materials in the presence of alkaline agents they yield intense blue to green-blue dyeings and prints having a very good fastness to wet processing and a good fastness to light.

The following examples illustrate the invention; the parts being by weight unless otherwise stated.

EXAMPLE 1

33.1 parts of 2-amino-8-(β-hydroxy-ethylsulfonyl)-naphthalene-6-sulfonic acid are dissolved in 150 parts of water, while adding sodium bicarbonate until neutral reaction. Subsequently, 44.7 parts of 4-bromo-1-amino-anthraquinone-2-sulfonic acid (85.5%), 0.6 part of copper (I)-chloride, 0.2 part of copper powder and 34 parts of sodium bicarbonate are added one after the other, the reaction mixture is stirred for one hour at room temperature, then heated slowly to 65° C. and stirred at this temperature until the condensation is complete. The dyestuff is precipitated from the solution obtained by acidification with hydrochloric acid and addition of potassium chloride, then purified by dissolution in water and reprecipitation with hydrochloric acid and potassium chloride, and finally dried. Printed on cotton in the presence of alkaline agents and subsequently thermofixed, the dyestuff yields a green-blue print fast to washing and to light.

For the conversion into the sulfuric acid ester, 50 parts of the dyestuff obtained are introduced into 185 parts of concentrated sulfuric acid, and the whole is stirred until complete dissolution. This solution is then stirred into a mixture of 450 parts of ice and 50 parts of water. The ester dyestuff obtained is salted out with potassium chloride, filtered off, dissolved in 500 parts of water, while adding sodium bicarbonate until the pH is adjusted to 5.5, then again salted out with potassium chloride, filtered off and finally dried.

The dyestuff obtained is of very good water-solubility and suitable for printing as well as especially for dyeing purposes. Thus, intense green-blue dyeings of good to very good fastness to wet processing and very good fastness to light are obtained on natural or regenerated cellulose fibers from salt-containing cold or warm dyeing baths in the presence of alkaline agents.

In the form of its free acid, the dyestuff corresponds with the formula

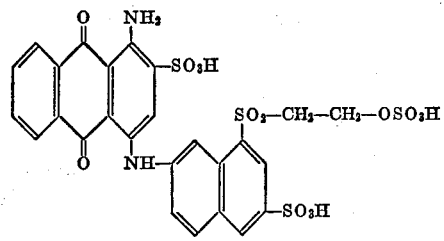

In comparison to the dyestuffs next in constitution known from German Pat. 965,902, Examples 14 and 48, this dyestuff is distinguished by a better water solubility, a greater stability of alkaline printing pastes and dyeing baths and a greater affinity to fibres.

In the form of its free acid, the dyestuff corresponds with the following formula

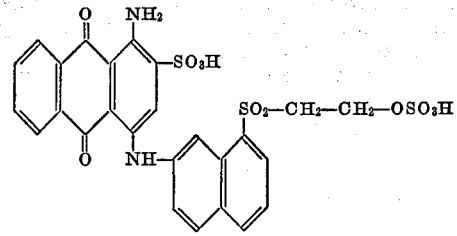

Dyestuffs having very similar dyeing properties are obtained when in the aforementioned Example 2 instead of the 2-amino-8-($\beta$-hydroxy-ethylsulfonyl)-naphthalene equivalent amounts of the naphthylamines of the General Formula 5 listed in the following table are used, and when instead of the 4-bromo-1-amino-anthraquinone-2-sulfonic acid equivalent amounts of the 4-bromo-1-amino-anthraquinone-sulfonic acids of the General Formula 4, also listed in the table, are used.

| Naphthylamine of the Formula 5 | 4-bromo-1-amino-anthraquinone-sulfonic acid of the Formula 4 | Shade |
| --- | --- | --- |
| 1-amino-4-($\beta$-hydroxy-ethylsulfonyl)-naphthalene | 4-bromo-1-amino-anthraquinone-2-sulfonic acid | Blue. |
| 1-amino-5-($\beta$-hydroxy-ethylsulfonyl)-naphthalene | do | Do. |
| 1-amino-6-($\beta$-hydroxy-ethylsulfonyl)-naphthalene | do | Do. |
| 1-amino-7-($\beta$-hydroxy-ethylsulfonyl)-naphthalene | do | Do. |
| 2-amino-5-($\beta$-hydroxy-ethylsulfonyl)-naphthalene | do | Do. |
| 2-amino-6-($\beta$-hydroxy-ethylsulfonyl)-naphthalene | do | Do. |
| 2-amino-7-($\beta$-hydroxy-ethylsulfonyl)-naphthalene | do | Do. |
| 1-amino-5-($\beta$-hydroxy-ethylsulfonyl)-naphthalene | 4-bromo-1-amino-anthraquinone-2,5-disulfonic acid | Blue-green. |
| Do | 4-bromo-1-amino-anthraquinone-2,6-disulfonic acid | Do. |
| Do | 4-bromo-1-amino-anthraquinone-2,8-disulfonic acid | Do. |
| Do | 4-bromo-1-amino-anthraquinone-2,5,8-trisulfonic acid | Do. |
| 3-amino-1,5-bis-($\beta$-hydroxy-ethylsulfonyl)-naphthalene | 4-bromo-1-amino-anthraquinone-2-sulfonic acid | Do. |
| 1-amino-3,6-bis-($\beta$-hydroxy-ethylsulfonyl)-naphthalene | do | Do. |
| 2-amino-6,8-bis-($\beta$-hydroxy-ethylsulfonyl)-naphthalene | do | Do. |
| 1-amino-5-($\beta$-hydroxy-ethylsulfonyl)-naphthalene-7-sulfonic acid | do | Do. |
| 1-amino-7-($\beta$-hydroxy-ethylsulfonyl)-naphthalene-4-sulfonic acid | do | Do. |
| 2-amino-6-($\beta$-hydroxy-ethylsulfonyl)-naphthalene-8-sulfonic acid | do | Do. |
| 2-amino-8-($\beta$-hydroxy-ethylsulfonyl)-naphthalene-6-sulfonic acid | do | Do. |
| 2-amino-6,8-bis-($\beta$-hydroxy-ethylsulfonyl)-naphthalene-3-sulfonic acid | do | Do. |
| 1-amino-6-($\beta$-hydroxy-ethylsulfonyl)-naphthalene-4-sulfonic acid | do | Do. |

EXAMPLE 2

25.9 parts of 2-amino-8-($\beta$-hydroxy-ethylsulfonyl)-naphthalene (97%) are stirred for 1 hour at room temperature together with 250 parts of water, 34 parts of sodium bicarbonate, 44.7 parts of 4-bromo-1-amino-anthraquinone-2-sulfonic acid (85.5%), 0.6 part of copper (I)-chloride and 0.2 part of copper powder. The reaction mixture is then heated slowly to 65° C., and stirring is continued until the condensation is complete. Subsequently, the dyestuff obtained is filtered off and thoroughly washed with diluted sodium chloride solution. The moist filter cake is then dissolved in 500 parts of water, while heating, the dyestuff is reprecipitated by adding 12 parts of 37% hydrochloric acid, filtered again, thoroughly washed with diluted sodium chloride solution and dried.

For the conversion into the sulfuric acid ester, 30 parts of the dyestuff obtained are introduced into 120 parts of concentrated sulfuric acid, and the whole is stirred until complete dissolution. This solution is then stirred into a mixture of 750 parts of ice and 750 parts of 10% potassium chloride solution, the precipitated ester dyestuff is filtered off and washed with 10% potassium chloride solution. The moist filter cake is dissolved in 500 parts of water with addition of sodium carbonate until the pH is adjusted at 5, the dyestuff is reprecipitated by adding potassium chloride, filtered and dried.

The dyestuff obtained is appropriate for printing and dyeing purposes. On natural or regenerated cellulose fibres it yields blue dyeings of good to very good fastness to wet processing and good fastness to light from salt-containing cold or warm dyeing baths in the presence of alkaline agents.

EXAMPLE 3

25.1 parts of 1-amino-5-($\beta$-hydroxy-ethylsulfonyl)-naphthalene are stirred for 1 hour at room temperature together with 250 parts of water, 34 parts of sodium bicarbonate, 44.7 parts of 4-bromo-1-amino-anthraquinone-2-sulfonic acid (85.5%), 0.6 part of copper (I)-chloride and 0.2 part of copper powder. The reaction mixture is then slowly heated to 65° C. and stirred at this temperature until the condensation is complete. The condensation product is isolated and purified in the same manner as indicated in paragraph 1 of Example 2, and its corresponds with the formula

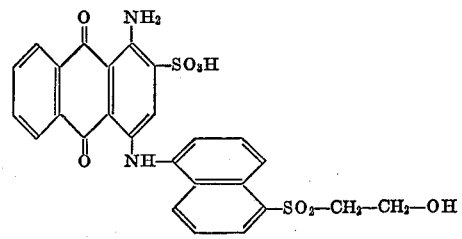

For the conversion into the phosphoric acid ester, 30 parts of the condensation product obtained are introduced at 130° C. to 135° C. into 150 parts of polyphosphoric acid (84% $P_2O_5$). The mixture is stirred for 2 hours at 130°–135° C. Subsequently, the hot melt is stirred into 225 parts of water, and the whole is refluxed for 1 hour to boiling temperature, and then allowed to cool down, which causes the phosphoric acid ester of the dyestuff to crystallize. The separation is completed by adding sodium chloride solution, the dyestuff is filtered off and washed with sodium chloride solution. The moist filter cake is then dissolved in 400 parts of water while adding sodium bicarbonate until a pH of 5 is reached and the solution obtained is evaporated to dryness. The dyestuff obtained is appropriate for the dyeing and especially printing of cotton, spun-rayon or rayon on which, in the presence of alkaline agents, it yields greenish blue dyeings of good to very good fastness to wet processing and good fastness to light. In form of its free acid, the dyestuff corresponds with the formula

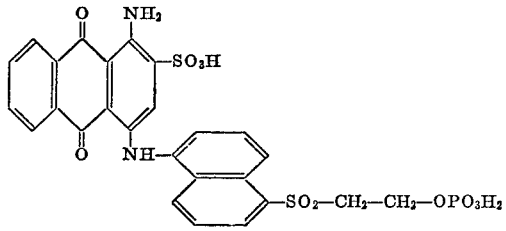

EXAMPLE 4

26.5 parts of 1-amino-5-(β-hydroxy-ethylsulfonyl)-naphthalene-7-sulfonic acid are dissolved neutral in 200 parts of water with addition of sodium hydroxide solution. 35.5 parts of 4-bromo-1-amino-anthraquinone-2-sulfonic acid (85.5%), 45 parts of sodium bicarbonate, 0.6 part of copper (I)-chloride and 0.2 part of copper powder are added to this solution; the reaction mixture is stirred for 1 hour at room temperature, then heated slowly to 65° C., and stirring is continued until the condensation is complete. The condensation product is isolated and purified in the same manner as described in paragraph 1 of Example 1, and its corresponds with formula

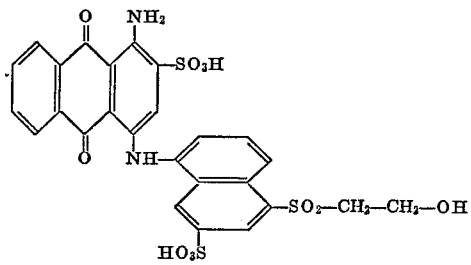

For the conversion into the sulfuric acid ester, 50 parts of the condensation product obtained are introduced into 185 parts of concentrated sulfuric acid, and the whole is stirred until complete dissolution. This solution is stirred into a mixture of 450 parts of ice and 50 parts of water. The ester dyestuff obtained is salted out with potassium chloride, filtered off and then dissolved in 450 parts of water, while adding sodium bicarbonate until a pH of 5.5 is reached. The solution obtained is evaporated to dryness.

The dyestuff obtained in this way corresponds in the form of its free acid with the formula

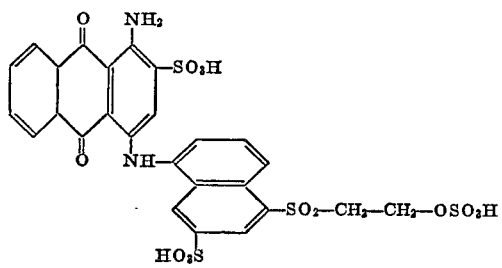

142.2 parts of the dyestuff are dissolved in 1,100 parts of water at 70° C. The solution is allowed to cool down to 40° C., and after 15 parts of diethylamine are added, it is allowed to cool further to 25°–30° C. At this temperature, 32.5 parts of 33% sodium hydroxide solution are added slowly, until a pH of 12.0 to 12.5 is reached. Subsequently, the whole is stirred for 16 hours at 18°–22° C. The pH of the reaction mixture is then adjusted to 7.8–8.3 by adding 36 parts of 20% hydrochloric acid, the precipitated dyestuff is filtered off, washed with sodium chloride solution and dried.

The dyestuff so obtained corresponds with the formula

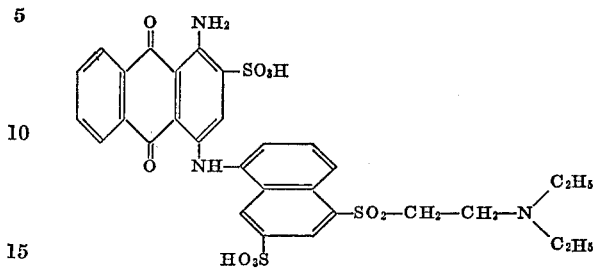

and is soluble in water yielding a blue solution. It is particularly appropriate for the printing of cotton fabrics and in the presence of alkaline agents yields intense greenish blue prints having excellent fastnesses. The stability of alkaline printing pastes made from this dyestuff is very good.

EXAMPLE 5

31.6 parts of the dyestuff of the formula

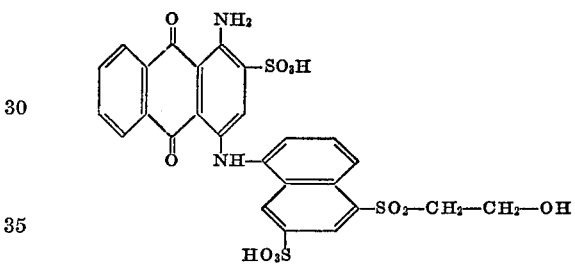

the preparation of which is described in paragraph 1 of Example 4, are dissolved in 150 parts of pyridine. 13.3 parts of benzoic acid-3-sulfochloride are introduced into this solution; the temperature rises to about 45° C. during this operation. The reaction mixture is then further heated to 90° C. and stirred for 1 hour at this temperature. Subsequently, the pyridine is distilled off in vacuo. The residue is dissolved with 300 parts of water, while heating. The dyestuff is separated from the solution obtained by salting out with sodium chloride. In order to purify the dyestuff, it may be again dissolved in water and salted out. After drying, 45 parts of the salt-containing dyestuff are obtained which dissolves in water yielding a greenish blue solution and which in the presence of alkaline agents is suitable for the dyeing and printing of cellulose textile materials. Green-blue prints and dyeings having a very good fastness to washihng are obtained.

The dyestuff corresponds with the formula

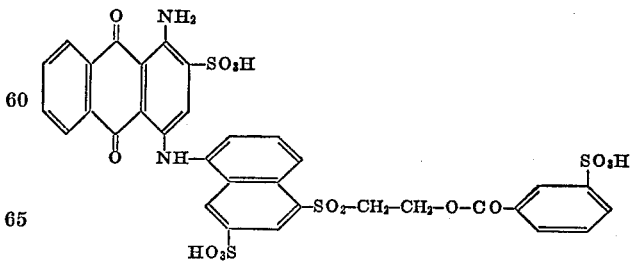

Dyestuffs having similar properties are obtained, when in the above mentioned Example 5 instead of 13.3 parts of benzoic acid-3-sulfochloride equivalent amounts of the following acid chlorides are used: acetyl chloride, benzoyl chloride, methane-sulfonic acid chloride or p-toluene-sulfonic acid chloride. The esterification may be carried out also at lower temperatures, for example between 0 and 10° C.

9

EXAMPLE 6

35.6 parts of the dyestuff of the formula

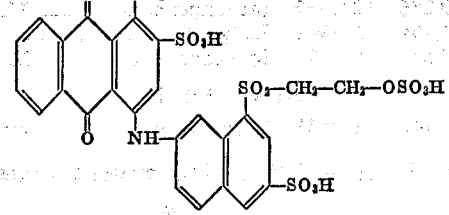

obtained in the process described in Example 1 are dissolved in 350 parts of water. About 30 parts of 33% sodium hydroxide solution are added slowly to this solution at 25°–30° C., until a pH of 12.0–12.5 is reached and remaining. Stirring is continued for a short time; the solution is made neutral by adding hydrochloric acid, and the dyestuff is isolated by salting out with sodium chloride.

The dyestuff obtained corresponds in the form of its free acid with the formula

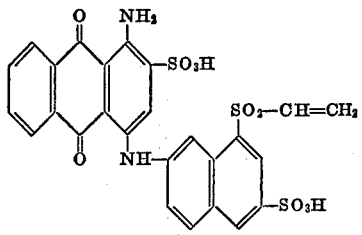

and it is highly appropriate for the dyeing and printing of cotton fabrics on which, in the presence of alkaline agents, it yields green-blue dyeings and prints having very good fastnesses to washing and to light. In comparison to the dyestuffs next in constitution known from German Pat. 960,534, Example 6, this dyestuff is distinguished by a better water-solubility, a greater stability of alkaline printing pastes and dyeing baths and a greater affinity to fibres.

EXAMPLE 7

30.7 parts of the vinylsulfonyl dyestuff of the formula

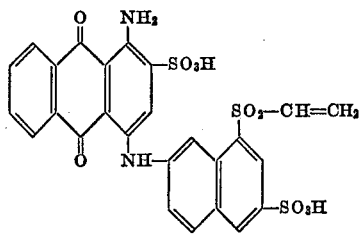

the preparation of which is described in Example 6, are introduced into 500 parts of water and heated to 50°–55° C. The pH is adjusted to 5.2–5.7. After addition of 18.8 parts of sodium thiosulfate containing water of crystallization, the cited pH value is maintained until the end of the reaction, at a temperature of 50°–55° C., by adding dropwise about 15 g. of 50% acetic acid. The dyestuff obtained is then salted out by adding sodium chloride, filtered off and dried. It corresponds with the formula

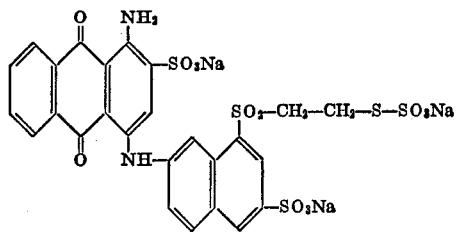

10 and is easily soluble in water yielding a green-blue solution. In the presence of alkaline agents, the dyestuff is suitable for the dyeing and printing of cellulose fibre materials. The dyeings and prints obtained are fast to washing and to light.

We claim:

1. A water-soluble anthraquinone dyestuff having in form of the free acid the formula

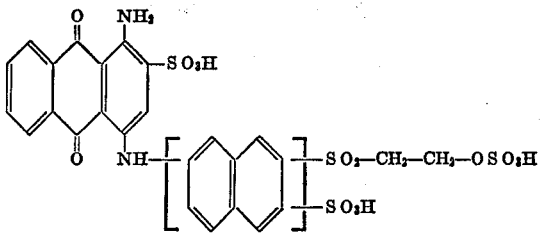

2. The dyestuff of the formula

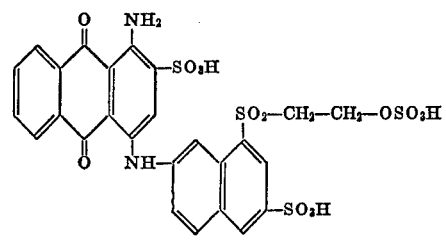

3. The dyestuff of the formula

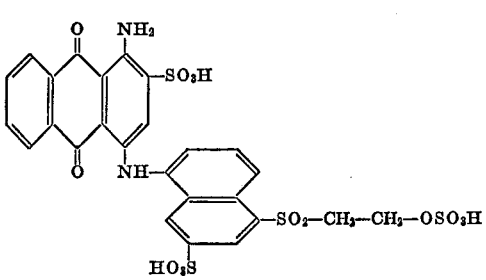

4. The dyestuff of the formula

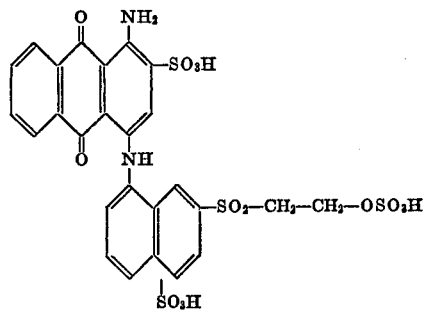

5. The dyestuff of the formula
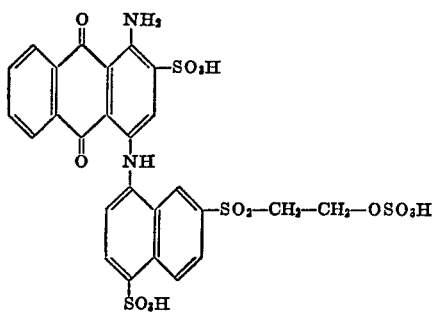
References Cited
UNITED STATES PATENTS
| | | |
|---|---|---|
| 3,372,170 | 3/1968 | Remy _____ 260—374 |
| 3,370,068 | 2/1968 | Meininger et al. _____ 260—374 |
| 3,359,286 | 12/1967 | Meininger et al. _____ 260—374 |
| 3,114,754 | 12/1963 | Lodge et al. _____ 260—372 |
| 3,663,576 | 5/1972 | Meininger et al. _____ 260—374 |
FOREIGN PATENTS
1,013,442  12/1965  Great Britain _____ 260—374
LORRAINE H. WEINBERGER, Primary Examiner
E. J. SKELLY, Assistant Examiner
U.S. Cl. X.R.
8—39, 40; 260—372